United States Patent
Murai et al.

(10) Patent No.: US 8,144,919 B2
(45) Date of Patent: Mar. 27, 2012

(54) ANNEALING ALGORITHM FOR NON-RECTANGULAR SHAPED STAINED GLASS COLLAGES

(75) Inventors: Kazumasa Murai, Hadano (JP); Patrick Chiu, Menlo Park, CA (US); Wolfgang H. Polak, Sunnyvale, CA (US); Andreas Girgensohn, Menlo Park, CA (US); Qiong Liu, Milpitas, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1273 days.

(21) Appl. No.: 11/525,589

(22) Filed: Sep. 22, 2006

(65) Prior Publication Data

US 2008/0075390 A1 Mar. 27, 2008

(51) Int. Cl.
*G06K 9/00* (2006.01)

(52) U.S. Cl. ........................... 382/100; 382/284
(58) Field of Classification Search ............... 382/284
See application file for complete search history.

(56) References Cited

U.S. PATENT DOCUMENTS

| | | | |
|---|---|---|---|
| 5,153,923 A * | 10/1992 | Matsuba et al. | 382/158 |
| 6,075,905 A * | 6/2000 | Herman et al. | 382/284 |
| 6,123,362 A * | 9/2000 | Squilla et al. | 283/67 |
| 6,157,747 A * | 12/2000 | Szeliski et al. | 382/284 |
| 6,636,650 B1 * | 10/2003 | Long et al. | 382/295 |
| 6,687,419 B1 * | 2/2004 | Atkin | 382/284 |
| 6,727,909 B1 * | 4/2004 | Matsumura et al. | 345/629 |
| 6,912,293 B1 * | 6/2005 | Korobkin | 382/100 |
| 6,934,052 B2 * | 8/2005 | Venable | 358/1.18 |
| 7,123,779 B2 * | 10/2006 | Beuker et al. | 382/294 |
| 7,529,429 B2 * | 5/2009 | Rother et al. | 382/284 |
| 7,542,594 B2 * | 6/2009 | Ikeda | 382/124 |
| 7,573,486 B2 * | 8/2009 | Mondry et al. | 345/619 |
| 7,576,755 B2 * | 8/2009 | Sun et al. | 345/629 |
| 2002/0095439 A1 * | 7/2002 | Long et al. | 707/507 |
| 2002/0122067 A1 * | 9/2002 | Geigel et al. | 345/788 |
| 2003/0035592 A1 * | 2/2003 | Cornog et al. | 382/284 |
| 2003/0059107 A1 * | 3/2003 | Sun et al. | 382/165 |
| 2003/0076406 A1 * | 4/2003 | Peleg et al. | 348/36 |
| 2003/0095720 A1 * | 5/2003 | Chiu et al. | 382/284 |
| 2004/0080670 A1 * | 4/2004 | Cheatle | 348/441 |
| 2004/0165000 A1 * | 8/2004 | Nagahashi et al. | 345/629 |
| 2005/0071781 A1 * | 3/2005 | Atkins | 715/838 |

(Continued)

OTHER PUBLICATIONS

Jindong Wang, Jian Sun, Long Quan, Xiaouou Tang and Heung-Yeung Shum. "Picture Collage", 2006, CVPR 2006, vol. 1, pp. 347-354.*

(Continued)

*Primary Examiner* — Jason M Repko
*Assistant Examiner* — Gandhi Thirugnanam
(74) *Attorney, Agent, or Firm* — Morgan, Lewis & Bockius LLP

(57) ABSTRACT

The present invention relates to a method to make effective use of non rectangular display space for displaying a collage. In an embodiment of the invention, a heterogeneous set of images can be arranged to display the region of interest of the images to avoid overlapping regions of interest. The background gaps between the regions of interest can be filled by extending the regions of interest using a Voronoi technique. This produces a stained glass effect for the collage. In an embodiment of the present invention, the technique can be applied to irregular shapes including circular shapes with a hole in the middle. In an embodiment of the present invention, the technique can be used to print labels for disks.

33 Claims, 11 Drawing Sheets

U.S. PATENT DOCUMENTS

| | | | |
|---|---|---|---|
| 2005/0089213 A1* | 4/2005 | Geng | 382/154 |
| 2005/0220345 A1 | 10/2005 | Chiu et al. | |
| 2005/0220348 A1 | 10/2005 | Chiu et al. | |
| 2006/0062455 A1 | 3/2006 | Chiu et al. | |
| 2006/0062456 A1 | 3/2006 | Chiu et al. | |
| 2006/0064630 A1* | 3/2006 | Balinsky | 715/500 |
| 2006/0104542 A1* | 5/2006 | Blake et al. | 382/284 |
| 2006/0210166 A1* | 9/2006 | Takemoto et al. | 382/190 |
| 2007/0058884 A1* | 3/2007 | Rother et al. | 382/284 |
| 2007/0110335 A1* | 5/2007 | Taylor et al. | 382/284 |
| 2007/0253028 A1* | 11/2007 | Widdowson | 358/1.18 |
| 2008/0049976 A1* | 2/2008 | Isomura et al. | 382/106 |
| 2008/0101761 A1* | 5/2008 | Widdowson | 386/52 |
| 2008/0123993 A1* | 5/2008 | Widdowson | 382/284 |
| 2009/0316989 A1* | 12/2009 | Barbieri et al. | 382/173 |

OTHER PUBLICATIONS

Acoustica CD/DVD Label Maker. http://www.acoustica.com/cd-label-maker/.

Fogarty, et al., "Aesthetic information collages: Generating Decorative Displays That Contain Information," *Proceedings of UIST '01*(Nov. 11-14, 2001), 141-150.

Yeung and Yeo, "Video Visualization for Compact Presentation and Fast Browsing of Pictorial Content," *IEEE Trans. Circuits and Syst. Video Technol.*, vol. 7(5), (Oct. 1997), 771-785.

Acoustica CD/DVD Label Maker. http://www.acoustica.com/cd-label-maker/, visited Sep. 20, 2006.

Agarwala, A., Dontcheva, M., Agrawala, M., Drucker, S., Colburn, A., Curless, B., Salesin, D., Cohen, M. (2004). Interactive Digital Photomontage. *Proceedings of SIGGRAPH' 04*, pp. 294-302.

Case, L. (2005). HP Announces availability of LightScribe products, *PC Magazine* (Jan. 5, 2005). http://www.pcmag.com/article2/0,1759,1748462,00.asp.

Chiu, P., Girgensohn, A., Polak, W., Rieffel, E., Wilcox, L., Bennett, F. (2000). A genetic segmentation algorithm for image data streams and video. *Proceedings of GECCO '00*, pp. 666-673.

Chiu, P., Girgensohn, A., Liu, Q. (2003). 018B: Stained-Glass Visualization for Highly Condensed Summarization of Videos and Images.

CollageMaker. http://www.galleriasoftware.com (visited Jul. 6, 2006).

Fuji Photo Film Co. (2005). Fujifilm and Yamaha introduce Labelflash technology. Fujifilm News Releases, Oct. 19, 2005. http://www.fujifilm.com/news/n051019.html (visited May 15, 2006).

Girgensohn, A., Chiu, P. (2004). Stained Glass Photo Collages. *UIST '04* Poster.

HP LightScribe. http://www.lightscribe.com (link visited May 22, 2006).

Kirkpatrick, S., C. D. Gelatt Jr., M. P. Vecchi. (1983). Optimization by Simulated Annealing. *Science*, 220 (4598), pp. 671-680, 1983.

Picasa. http://picasa.google.com/ (visited Jul. 6, 2006).

PhotoMix. http://www.photomix.com/ (visited Jul. 6, 2006).

SureThing CD/DVD Labeler. http://www.surething.com/st/Category.asp?CatCode=ST4_HOME (visited Jul. 6, 2006).

Uchihashi, S., Foote, J., Girgensohn, A., and Boreczky, J. (1999). Video Manga: Generating semantically meaningful video summaries. Proceedings ACM Multimedia '99, pp. 383-392.

\* cited by examiner

ANNEALING ALGORITHM FOR NON-RECTANGULAR SHAPED STAINED GLASS COLLAGES

CROSS REFERENCES TO RELATED APPLICATION

This application is related to the following applications:

(1) Application Ser. No. 10/815,389 entitled "Extracting Video Regions of Interest" by Patrick Chiu, et al., filed Mar. 31, 2004;

(2) Application Ser. No. 10/815,354 entitled "Generating a highly Condensed Visual Summary" by Patrick Chiu, et al., filed Mar. 31, 2004;

(3) Application Ser. No. 10/948,730 entitled "Determining Regions of Interest in Photographs and Images" by Patrick Chiu, et al., filed Sep. 23, 2004;

(4) Application Ser. No. 10/948,823 entitled "Determining Regions of Interest in Photographs and Images" by Patrick Chiu, et al., filed Sep. 23, 2004; and (5) Application Ser. No. 11/405,311 entitled "Cascading Cluster Collages: Visualization of Image Search Results on Small Displays" by Patrick Chiu et al., filed Apr. 17, 2006, which are all expressly incorporated in their entireties herein by reference.

FIELD OF THE INVENTION

The present invention relates to a method to make effective use of display space for irregularly shaped collages.

BACKGROUND OF INVENTION

A huge amount of digital photos and videos are being created with the ubiquitous digital cameras, camera cell phones and personal digital assistants. An important challenge is figuring out ways to manage and visualize collections of photos and videos. Another challenge is viewing presentation content on irregular shaped displays where the content must be condensed to efficiently and effectively be displayed.

In U.S. patent application Ser. No. 10/815,389, entitled "EXTRACTING VIDEO REGIONS OF INTEREST" and U.S. patent application Ser. No. 10/815,354, entitled "GENERATING A HIGHLY CONDENSED VISUAL SUMMARY", a method was disclosed to summarize and condense a video using a Stained-Glass Visualization, which shows a video using a storyboard generated from Regions of Interest (ROI) in the key frames of the highly ranked video segments. The ROIs are laid out and the gaps are filled by extending the ROIs using a Voronoi technique. This produces irregular boundaries and the result looks like a stained glass. Along with the visualization method, an algorithm was provided for finding the ROIs in a video segment based on motion analysis.

In U.S. patent application Ser. No. 10/948,730 entitled "DETERMINING REGIONS OF INTEREST IN PHOTOGRAPHS AND IMAGES" and U.S. patent application Ser. No. 10/948,823 entitled "DETERMINING REGIONS OF INTEREST IN PHOTOGRAPHS AND IMAGES", STAINEDGLASS COLLAGES were applied to photos and synthetic images such as POWERPOINT slides.

DESCRIPTION OF THE PRIOR ART

Disk Labeling Technology

FUJIFILM and YAMAHA have recently introduced a technology for printing disk labels called Labelflash®. FUJIFILM News Releases, Oct. 19, 2005. Using the same laser for data recording, graphics and text can be burned directly onto the dye on the label side of a disk. This technology works with DVD-R and DVD+R media, producing a blue-colored grayscale image. Using Labelflash® simplifies the labeling process for the user by eliminating the need for printers, sticker labels and ink, see FIG. 4.

HP LIGHTSCRIBE is similar to Labelflash®. Case, L. (2005). HP Announces availability of LightScribe products, *PC Magazine* (Jan. 5, 2005). The images are burned directly on the non-data side of the DVD disk. The grayscale color is sepia instead of blue.

In general, the irregular stained glass may have an arbitrary curve for its outer boundary and contain an arbitrary number of empty areas or holes (FIG. 3B). The user can specify such a shape by drawing the boundary and holes using standard techniques for drawing lines found in common graphics software applications. Another common way to specify a complex shape is for the user to take pre-defined basic shapes (e.g., rectangles, triangles, ellipses) and place them on the canvas window.

An annealing algorithm has previously been described. Kirkpatrick, S., C. D. Gelatt Jr., M. P. Vecchi. (1983). Optimization by Simulated Annealing. *Science*, 220 (4598), pp. 671-680, 1983.

Disk Labeling Software Technology

SURETHING CD/DVD LABELER DELUXE has a feature that creates a collage for a donut shaped disk or a rectangular jewel case label. It provides a 3×3 (or M×N) rectangular grid that can be filled with images. For a donut shaped disk label the rectangular grid is cropped.

ACOUSTICA CD/DVD LABEL MAKER is a popular label making software. It provides custom art for holidays and special occasions, and allows the user to add images and import his photos. A related product, ACOUSTICA PHOTO FOREVER, finds photos on a computer hard drive and backs them up on disks. It prints out a table of contents with thumbnails on sheets of paper, not disk labels.

Computer Generated Video Collages

Stained glass collages for representing a video as a collage are known. U.S. patent application Ser. Nos. 10/815,389; 10/815,354; Chiu, P., Girgensohn, A., and Liu, Q. (2004). Stained-Glass Visualization for Highly Condensed Video Summaries. Proc. IEEE Intl. Conf. on Multimedia and Expo (ICME '04). Collages of video using different sized keyframes in a storyboard layout include: FXPAL Video Manga and video posters. Uchihashi, S., Foote, J., Girgensohn, A., and Boreczky, J. (1999). Video Manga: Generating semantically meaningful video summaries. Proceedings ACM Multimedia '99, pp. 383-392; Yeung, M., Yeo, B.-L. (1997); Video visualization for compact presentation and fast browsing of pictorial content. IEEE Trans. Circuits and Syst. Video Technol., 7, 5 (October 1997), 771-785.

Computer Generated Photo Collages

Stained glass collages for representing photos and synthetic images are known. U.S. patent application Ser. Nos. 10/948,730; 10/948,823; Girgensohn, A., Chiu, P. (2004). Stained Glass Photo Collages. UIST '04 Poster. Photomontage generates collages by fusing images at places where they are similar. Agarwala, A., Dontcheva, M., Agrawala, M., Drucker, S., Colburn, A., Curless, B., Salesin, D., Cohen, M. (2004). Interactive Digital Photomontage. *Proceedings of SIGGRAPH* '04, pp. 294-302. The effect is quite distinctive because with Photomontage the seams between images are minimized.

Computer Generated Image Collages

Venable has described a method for image layout. U.S. Pat. No. 6,934,052. It formats a set of images into a single contact sheet-like layout for rapid viewing and cataloging. The target area is rectangular, and the images are rectangular of different sizes and aspect ratios. A simulated annealing program is used. It lays out whole images, all the objects are rectangles, and overlaps are not allowed.

'KANDINSKY' is a research system that creates collages from a set of input images plus a template. Fogarty, J., Forlizzi, J., Hudson, S., Aesthetic information collages: Generating decorative displays that contain information, Proceedings of UIST '01, pp. 141-150. The template is an image with regions (e.g. an abstract painting), and the input images are matched and composited into the template using simulated annealing, resulting in a collage.

Software Applications with Photo Collage Editing Features

COLLAGEMAKER is a graphics editor that has features for making and editing collages. The user can layout photos, merge photos seamlessly, and apply unique border and edge effects.

PHOTOMIX is a software application for digital scrap booking and photo collage creation. It has a feature for laying out a collage by providing layout templates that tessellate the canvas with different sized rectangles.

PICASA is a popular photo organizer that has features to help make photo collages. From a user selected set of photos, a picture collage can be created in several styles: Picture Pile, Picture Grid, Contact Sheet, Multi Exposure. The collages are basically rectangular: overlapping, grid, thumbnails, or blended on top of each other.

SUMMARY OF THE INVENTION

In an embodiment of the present invention, we define algorithms to make effective use of display space for showing regions of interest (ROI) of images in a non rectangular collage.

In various embodiments of the invention, in order to display a plurality of images on a non rectangular target area a germ, a support and an initial position on the target area can be determined for each of the images, thereafter a translation vector can be calculated for one of the germs and the germ can be moved according to the translation vector. The germ can be a ROI in a photo or keyframe. The support can be the remainder of the photo or keyframe not selected as the germ. Thereafter other translation vectors can be calculated for other germs and moved accordingly until a stopping condition criteria is met. In various embodiments of the invention, the plurality of images can be a set of photos. In alternative embodiments of the invention, the plurality of images can be a set of video keyframes.

In various embodiments of the present invention, the target area can be an irregular shape. In various alternative embodiments of the invention, the target area can be circular. The germs can be arranged on the target shape such that the centroid of the germ is assigned as a point position representing the germ. The distance between this point and other points representing the distance between germs can thus be calculated. In an embodiment of the invention, a uniform scaling factor can be applied to all germs in order to assure that all germs fit within the target area.

With a circular target, a radial time line can be used to order the germs displayed as a collage. With a circular target, a hole can be positioned in the middle of the target area. In an embodiment of the invention, the circular collage can be printed on a disk as a disk label. With a circular collage printed as a disk label, the hole can correspond to the axis point of rotation of the disk. In an alternative embodiment, a single photo or key frame to be emphasized in the collage can be selected to occupy the central hole.

In an embodiment of the invention, the initial positions of the 'N' germs can be determined randomly. In an alternative embodiment of the present invention, the germs can be iteratively moved from this random arrangement by calculating the expected distance between points on the target area and then selecting for movement a germ to a 'N+1' random position. In an embodiment, the iteration can be carried out until a predetermined number of germs have been selected and/or moved. Alternatively, the iteration can be stopped when all germs are half the expected distance from all other germs. In an embodiment, the selected germ is moved provided that this results in a greater distance between the selected germ and the other germs.

In an alternative embodiment of the present invention, the initial position of the germs can be assigned based on the size of the germs, wherein the largest germ is assigned to the point farthest from any other point and the next largest germ to the next point farthest from any other. In another alternative embodiment of the present invention, the initial position of the germs can be assigned based on the sequence of the germs. For example, if the germs are key frames from a video then the sequence can be the order of the keyframes in the video.

In an embodiment of the invention, the germ to be moved can be randomly selected. In an alternative embodiment of the invention, a germ can be selected based on the distance each germ needs to be moved, wherein the germ with the greatest distance to be moved is selected.

In an embodiment of the invention, the translation vector can be determined using an annealing algorithm. In various embodiments of the invention the annealing algorithm can include a dampening factor and/or a perturbation factor.

In an embodiment of the invention, the germs are rescaled after they are assigned a position in order to make efficient use of the target area. In an embodiment of the invention, the color or composition of pixels not assigned to the germs in the target area or 'empty space' can be assigned based on the support. In an embodiment of the invention, the support corresponding to the closest germ in the target area is used to assign empty space. In an embodiment of the invention, the empty space is filled by a Voronoi algorithm.

An especially useful case is the donut shaped stained glass collage, for which we describe two applications. The first application is for creating and printing disk labels for DVDs with video or photos. The donut shaped stained glass matches the shape of a round disk with a hole in the middle (FIG. 3A). The stained glass is generated from the contents of the disk (e.g. video or photos) and provides a visual summary of the contents.

Another application of a donut shaped stained glass can be for creating a collage with a center-peripheral layout. An image can be placed in the center hole for emphasis, and the surrounding donut collage shows peripheral information. In contrast, the collage in FIG. 1 is rectangular and there is no single image that is emphasized due to its spatial location. The center-peripheral layout is a popular feature request from users of STAINEDGLASS, and can be generalized in several ways. For example, the shape can be a heart instead of circular outer boundary. Another method can be to vary the number of areas for emphasis, instead of having a single area in the center. A shape is considered circular if it has an outer boundary or perimeter that is round or oval and includes annular shapes.

BRIEF DESCRIPTION OF THE DRAWINGS

Preferred embodiments of the present invention will be described in detail based on the following figures, wherein.

DETAILED DESCRIPTION

Previously, STAINEDGLASS was used only with rectangular shaped collages. However, sometimes it is desirable to have irregular shaped stained glass collages. This allows users to be more expressive. There are also specific applications where it is desirable to create a collage to fit a region that is not rectangular.

Figure 5:
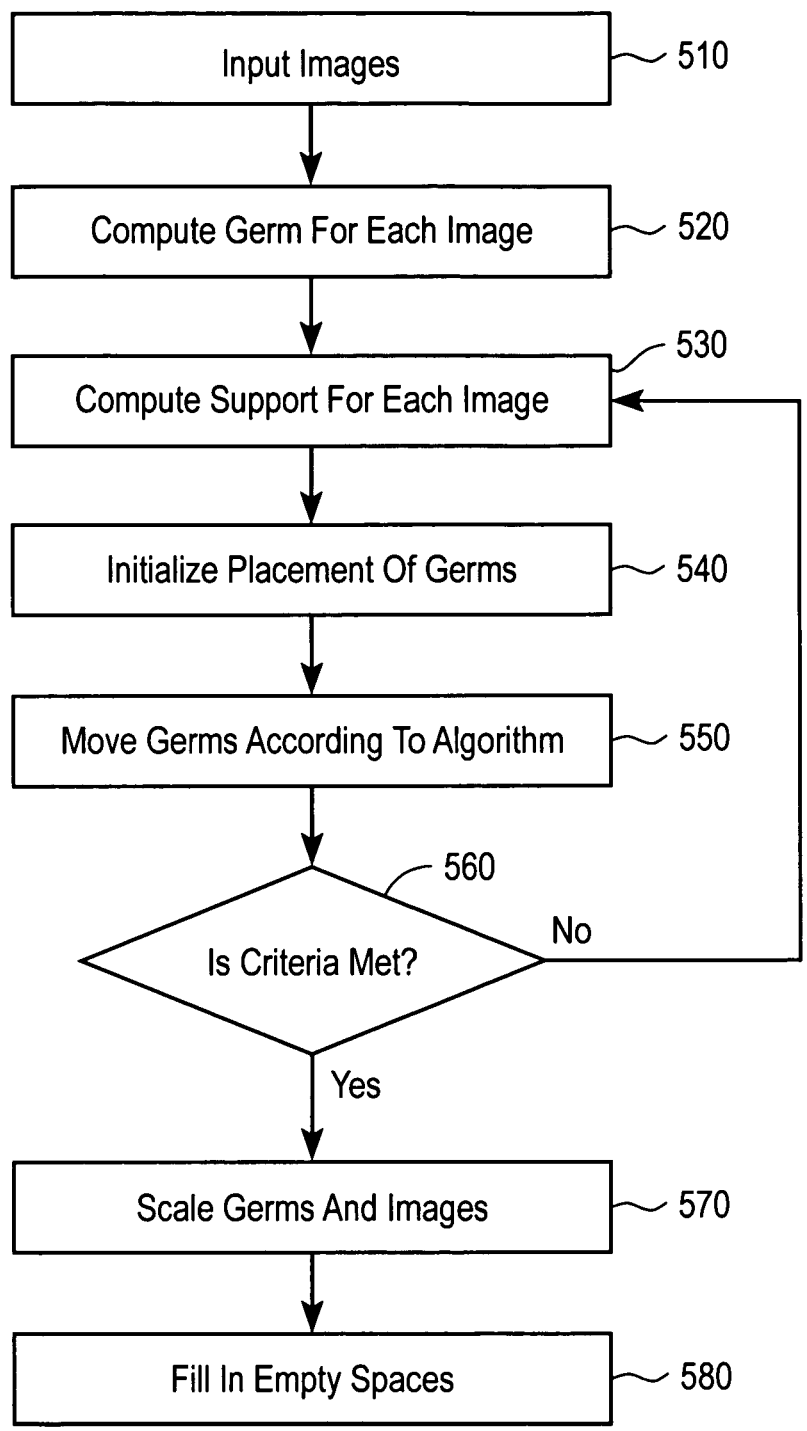
FIG. 5 shows flowchart for basic algorithm.

Once the input (images) and output (irregular shaped area) have been specified, a stained glass collage can be calculated using an annealing approach. In various embodiment of the present invention, a germ can be the central object in an image. A germ can be closely related to the ROI detected in the image. In an embodiment of the present invention, the germ can be the dominant ROI. In an embodiment, the germ can also be the largest ROI. After the germs are laid out, the empty areas can be filled using a Voronoi algorithm. The basic algorithm is illustrated in FIG. 5. The images are first input at step 510. Next the germ and support are computed for each image (steps 520 and 530 respectively). The germs can be placed on the irregular (or otherwise) shaped area (step 540). The germs can be moved according to the annealing algorithm (step 550). Based on the new positions of the germs, it can be determined if the stopping conditions have been met (step 560). If the stopping conditions have not been met, then the algorithm returns to step 550 and another germ can be moved accordingly. If the stopping condition is met, then the germs can be scaled (step 570). Finally, the empty spaces between the germs can be filled in using the Voronoi algorithm (step 580).

Figure 7:
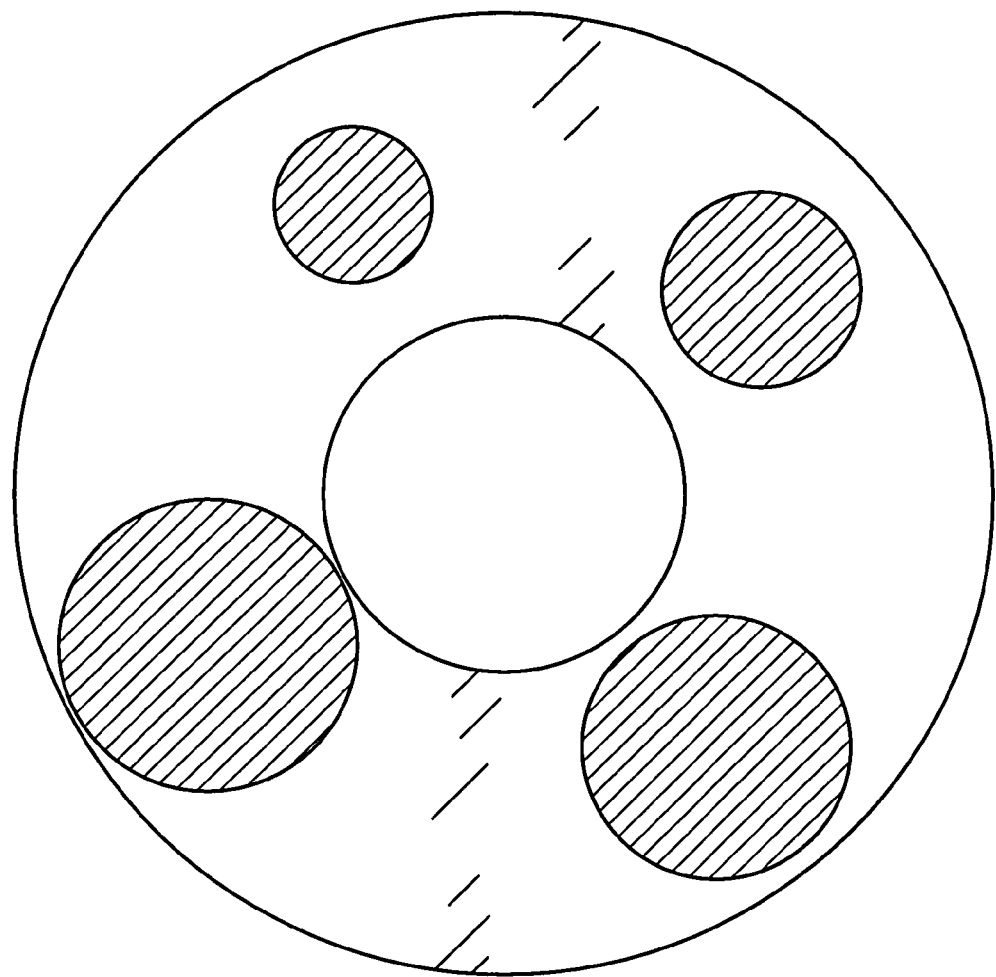
FIG. 7 shows final result with 4 germs.
Figure 8A:
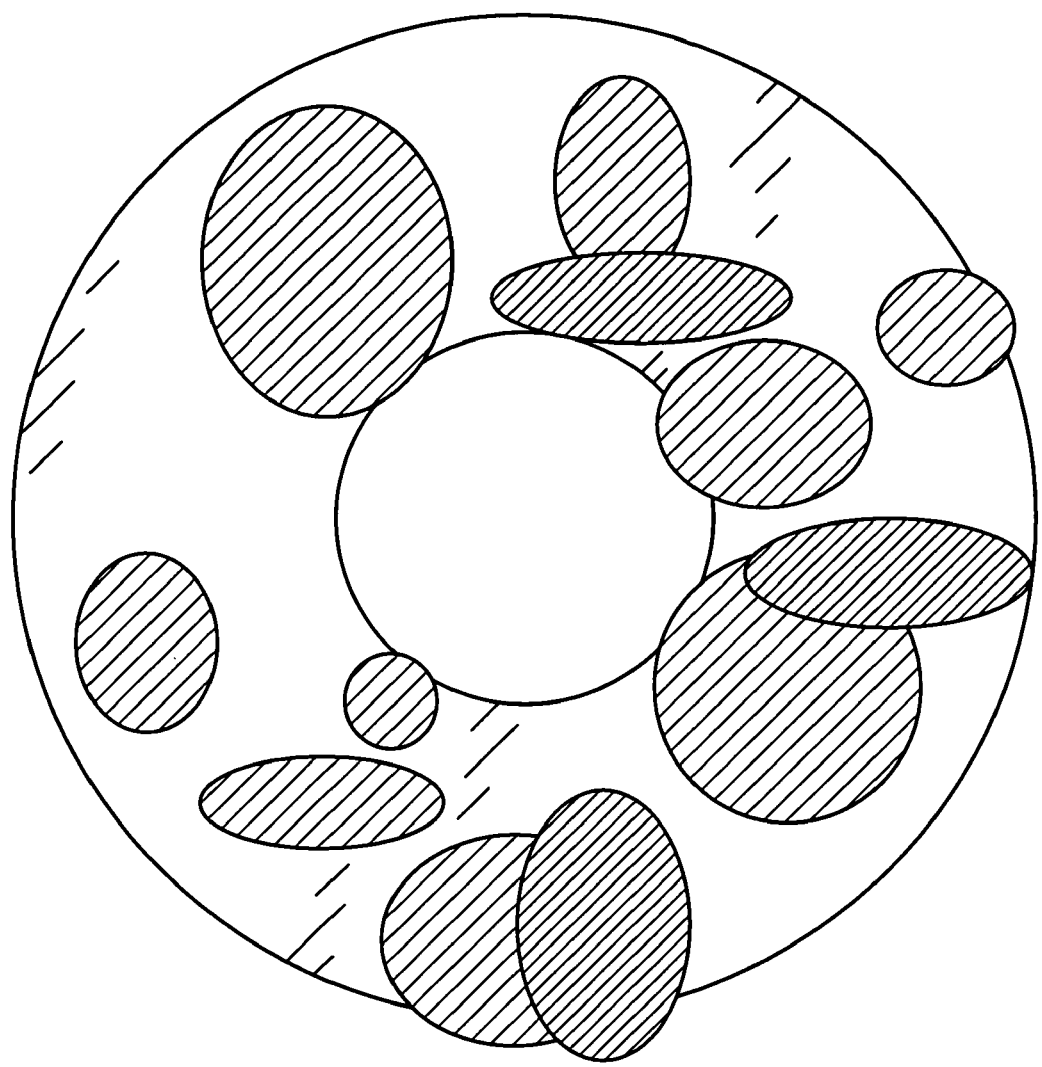
FIG. 8 shows (A) early state and (B) final result with 12 elliptical germs.
Figure 8B:
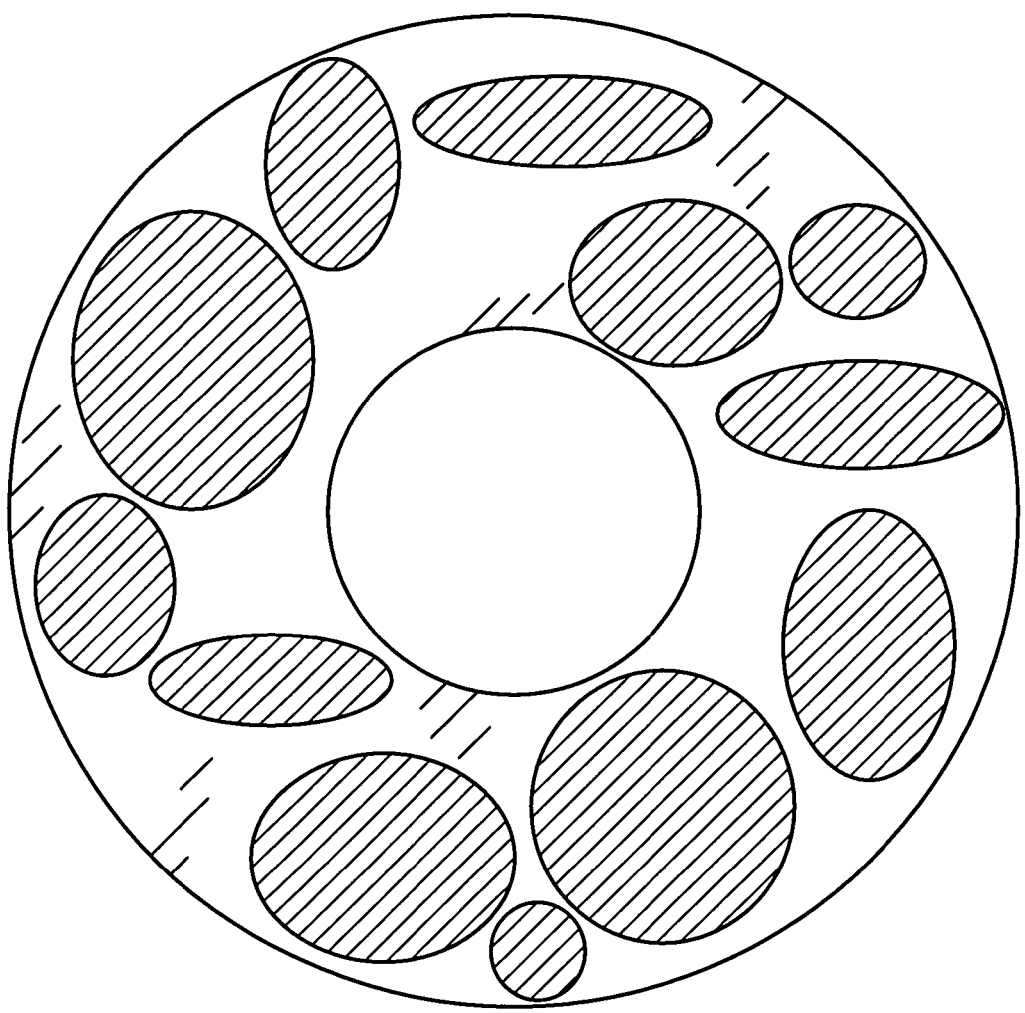

FIG. 7 and FIG. 8 illustrate results of the algorithm applied to the ring of a DVD using circular germs. While the illustrations use circular or elliptic germs and areas, other shapes can be used. In embodiments of the present invention, the distance computations have to be adapted to the different shapes.

Input Images

The input can be a set of images. For photos, these can be a small subset of favorite pictures from a collection or a selected subset of pictures to illustrate an event. For videos, the images can be keyframes extracted from the video, and a small subset can be selected manually by the user or automatically via content analysis algorithms (e.g. U.S. Pat. No. 6,819,795; Chiu, P., Girgensohn, A., Polak, W., Rieffel, E., Wilcox, L., Bennett, F. (2000). A genetic segmentation algorithm for image data streams and video. *Proceedings of GECCO '00*, pp. 666-673).

Compute Germ and Support for Each Image

Figure 2:
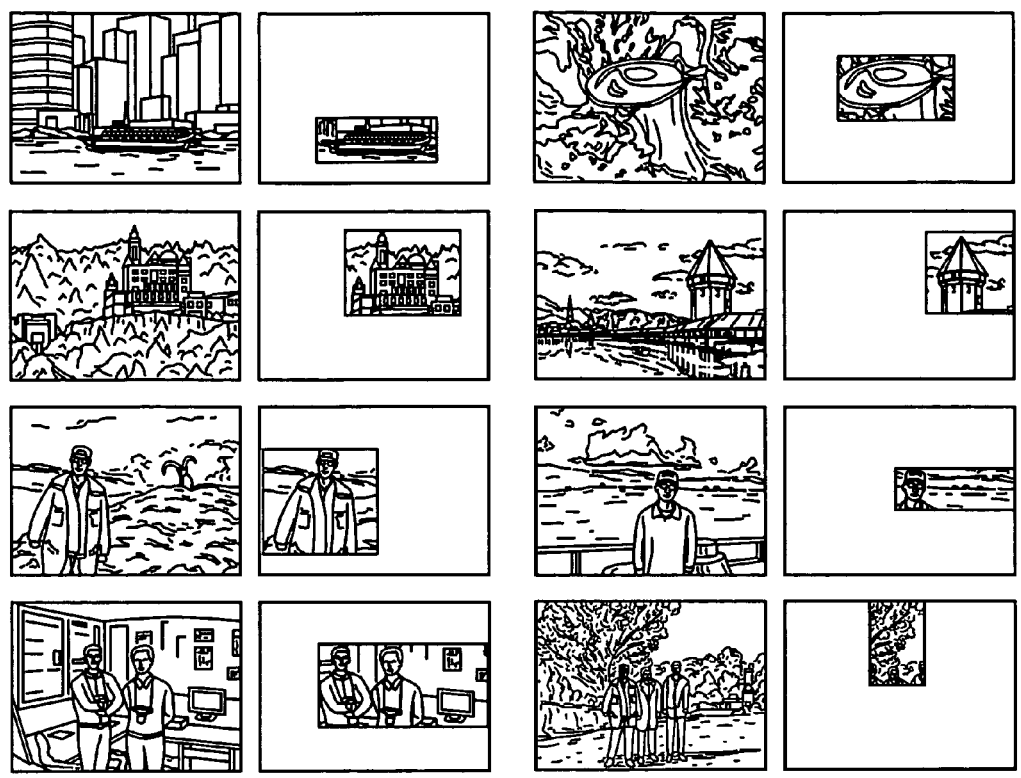
FIG. 2 shows a set of images and their germs.
Figure 3A:
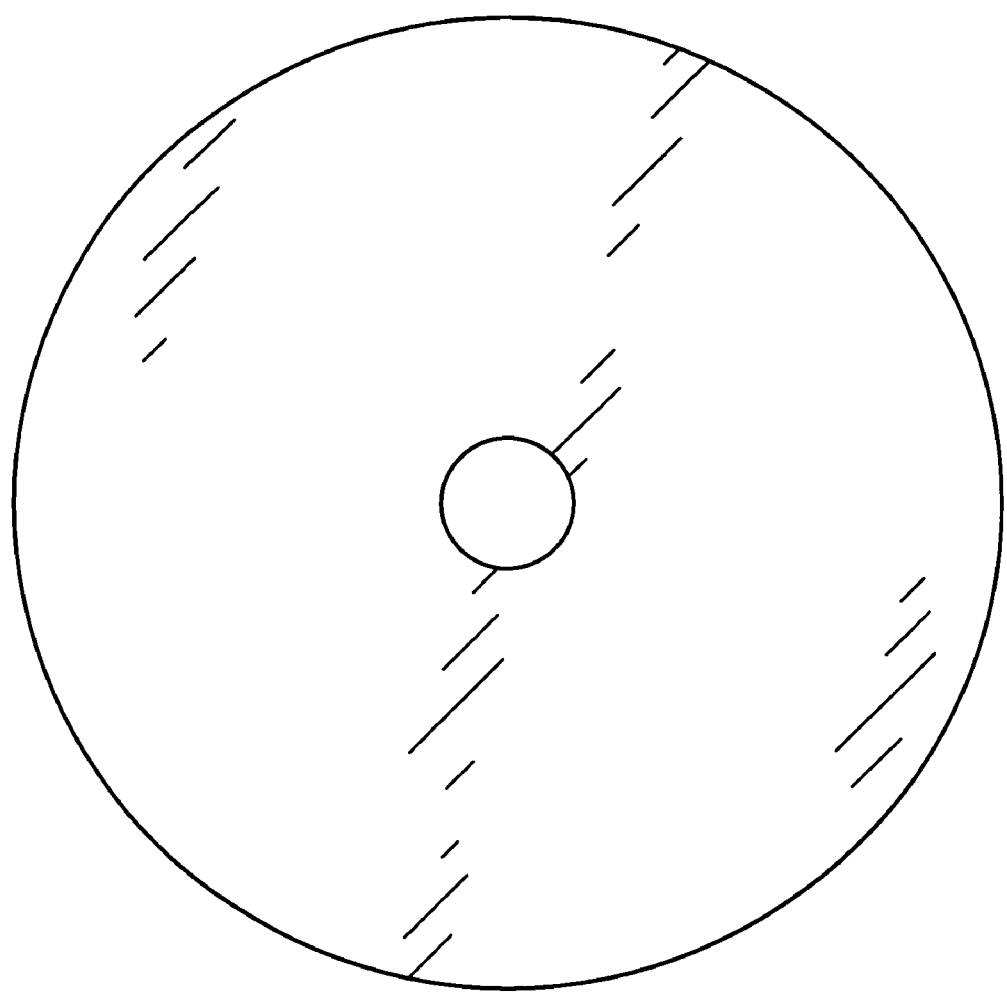
FIG. 3 shows an example of irregular shaped areas.
Figure 3B:
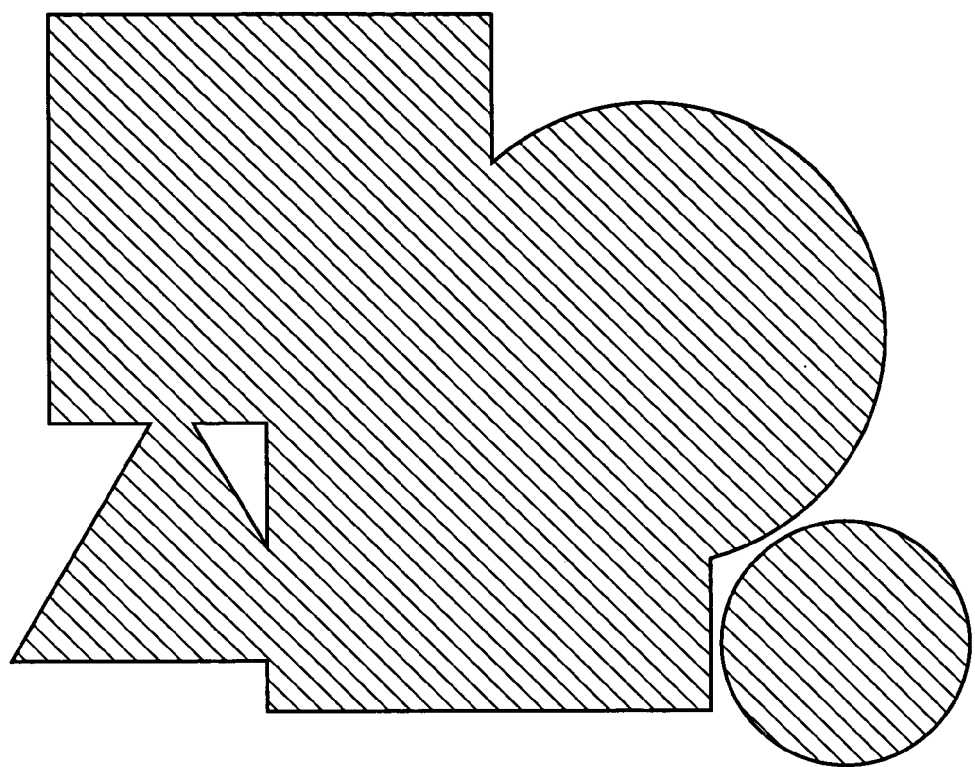
Figure 4:
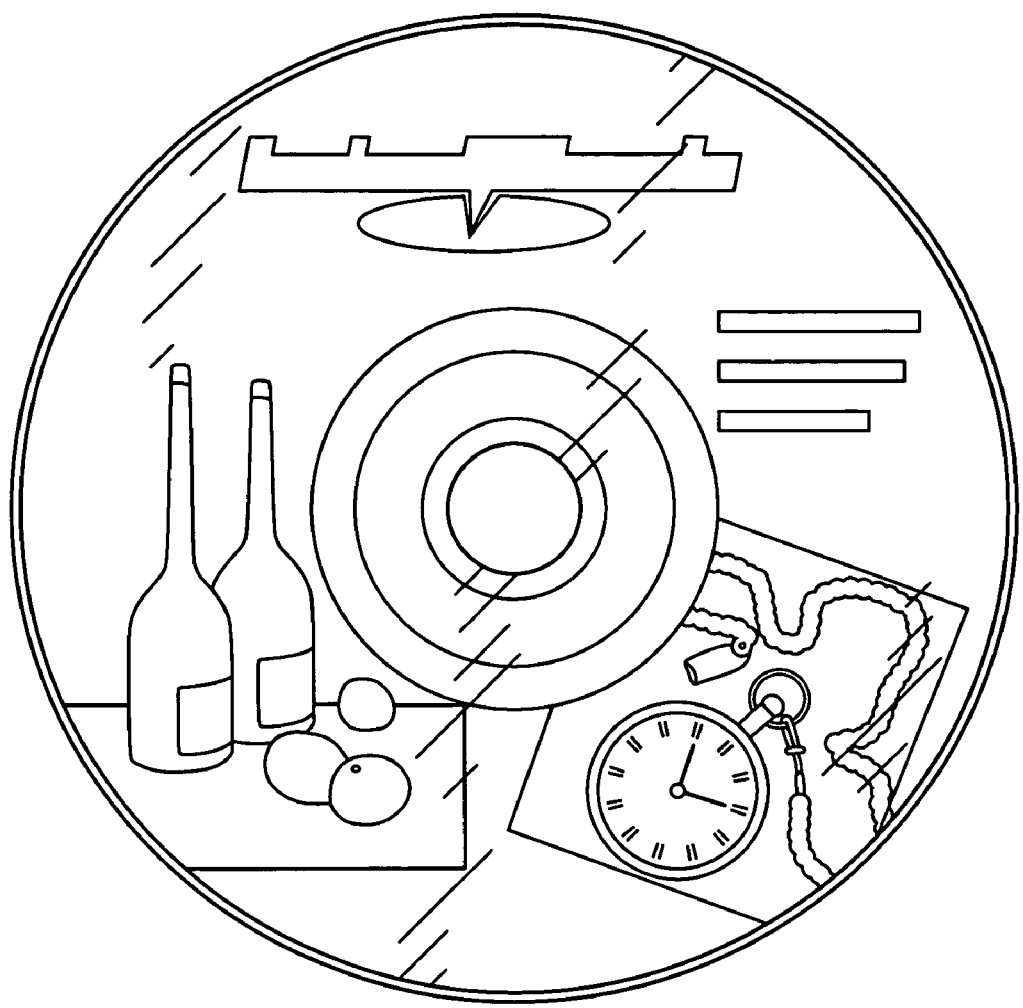
FIG. 4 shows Labelflash® sample.

For each image, the germ and support are computed using a previously described algorithm. U.S. patent application Ser. Nos. 10/815,389; 10/815,354; 10/948,730; 10/948,823; Chiu, P., Girgensohn, A., and Liu, Q. (2004). Stained-Glass Visualization for Highly Condensed Video Summaries. *Proc. IEEE Intl. Conf. on Multimedia and Expo (ICME '04)*. A germ can be closely related to the regions of interest (ROI) detected in the image. In an embodiment of the present invention, the germ can be the dominant ROI. In an embodiment, the germ can also be the largest ROI. See FIG. 2. A support can be the image pixels outside the germ. In theory the support can extend beyond the image, e.g. using panorama construction techniques to fuse adjacent photos or keyframes that overlap.

Let $\{g_i | 0 \leq i < N\}$ denote the set of N germs, and $\{c_i | 0 \leq i < N\}$ denote their centroids Initialize Placement of Germs in Target Area In an embodiment of the present invention, the initial germ positions $\{r_i\}$ can be randomly chosen. To improve the positions so that they are more spread out, an estimate of the expected distance can be calculated using $E=\sqrt{(\text{target area}/N)}$, where N is the number of images. After the $r_i$ has been assigned, $r_{i+1}$ can be determined by selecting random points until a point is greater in distance than E/2 to any other point, or until a condition of M selections is met (e.g. M=100).

The germs can be assigned arbitrarily to the positions. To improve the fit between large germs and the sparser points, the largest germ can be assigned to the point farthest from any other point, the next largest germ to the next point farthest from any other point, and so on.

In an embodiment of the present invention, if the images are in a sequence and it is desirable to reward keeping adjacent images nearby, the germs can be assigned to the positions $\{r_i\}$ in an orderly manner. For example, this can be done inductively: put germ $g_0$ at the position with minimum y-coordinate; after germ $g_n$ has been placed, take all the positions with y-coordinates above the bottom of $g_n$, then from these take the position with minimum x-coordinate for placing $g_{n+1}$.

Figure 9:
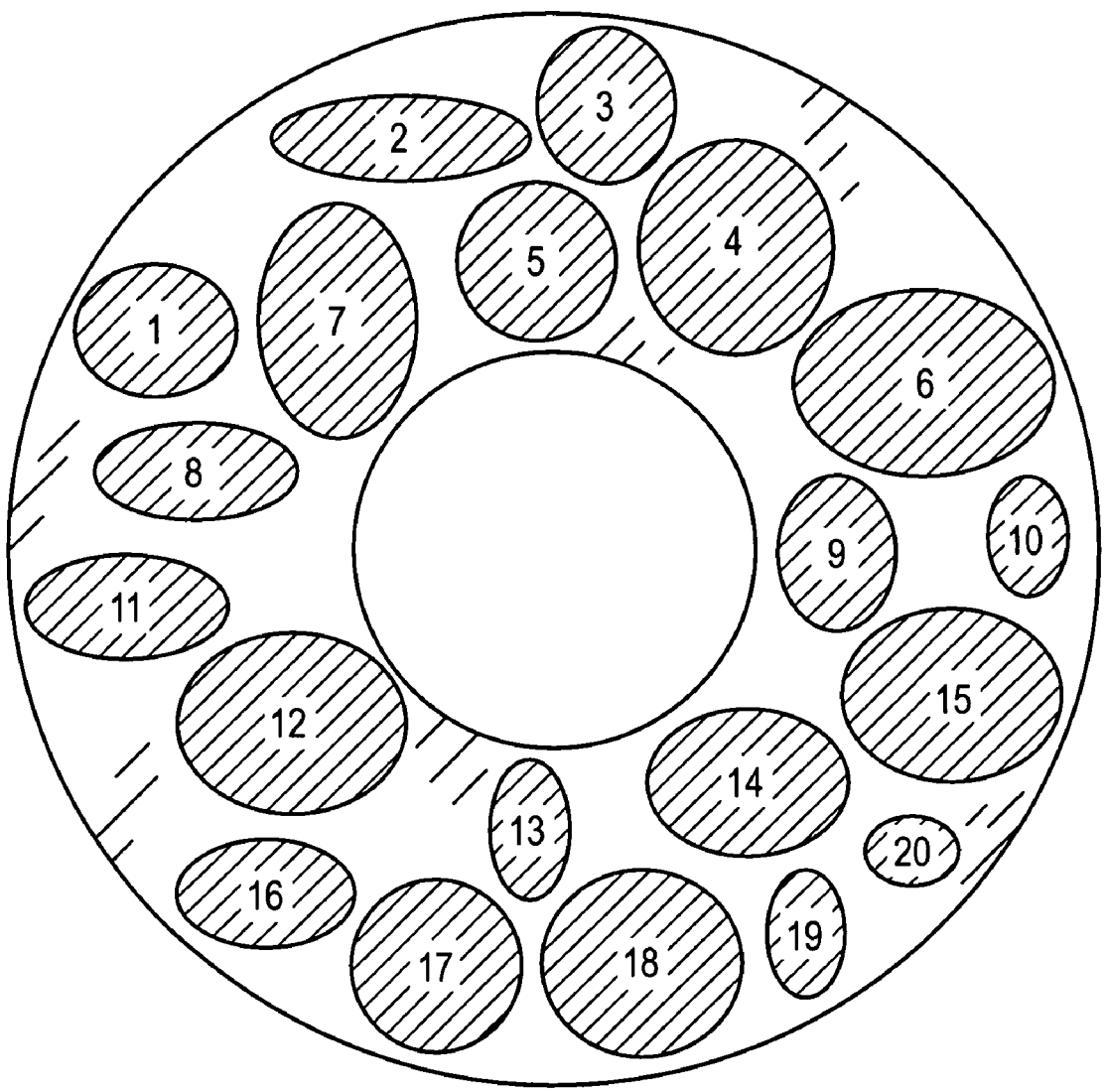
FIG. 9 shows final result with 20 elliptic germs kept in a row-wise order indicated by the numbers (4 rows with 5 germs each).

Alternatively, the germs can be placed in order initially by dividing the rectangular bounding box of the irregular area into a number of rows (e.g., equal to the square root of the number of germs), allowing the starting positions of the germs to be outside the irregular area. Roughly the same number of germs are placed in each row such that the distances between germs can be maximized. When a germ is outside the irregular area, the distance measure to the border returns negative values for those germs, indicating that those germs need to be moved larger distances. Our experiments show that this works well for the donut shaped area. FIG. 9 shows the results of keeping 20 elliptic germs in their original order.

Germs are scaled uniformly such that their total area can be a large fraction of the irregular area (e.g., 70%). Especially with a few germs, the uniform scale factor may need to be selected such that the largest germ can fit inside the irregular area (see FIG. 7). Germs can be scaled again at the end of the annealing algorithm, so approximate scaling is sufficient at the initial scaling point. In the annealing algorithm, the size of the germs contributes to distance computations but germ overlaps are not considered in the annealing algorithm.

Move Germs According to Annealing Algorithm

In an embodiment of the present invention, at each stage $t \in \{0, 1, 2, \ldots\}$ a move for one or more germs can be computed. A germ to be moved can be selected randomly or alternatively as the germ that needs to be moved the largest distance. The random function for selecting a germ can also take the distance that the germ needs to be moved into consideration, so that germs close to other germs are more likely to be selected The moves are done one germ at a time. The alternative of computing all the moves simultaneously does not offer any significant advantages.

The movement of germ $g_i$ can be computed as a translation vector $v_i=(x_i, y_i)$ in the following way. First, for a germ $g_i$, find the nearest point $p_1$ to the boundary of $g_i$, such that $p_1$ can be either on a germ boundary (excluding the i-th germ) or on the boundary of the irregular area.

To simplify the computation of $p_1$, we can constrain a candidate point s so that s can be on a line segment between $c_i$ and either another centroid, or between $c_i$ and a boundary point of the irregular area. Constraining candidate points to the line segment between two centroids can result in an overlap because the distance between shapes can be overestimated.

Next, find a point $p_2$ such that it is the intersection of the line from $c_i$ to $p_1$ and a boundary of $g_i$. The idea is to move away from the nearest point to some fraction of the estimated expected distance, plus a perturbation by a random vector that diminishes as the annealing progresses. More precisely, we can take $v_i$ as defined in equation 1.

$$v_i = \tau(t)(E - (|\overline{c_i p_1}| - |\overline{c_i p_2}|))\frac{\overline{c_i p_1}}{|\overline{c_i p_1}|} + \delta(t)D * w_i \quad \text{equation (1)}$$

This determines the unity vector pointing from $c_i$ towards $p_1$ and moves $g_i$ such that the distance between $c_i$ and $p_1$ would be E. The germ can be moved by more than the distance E if it overlaps another germ or is partially outside the irregular area. The move can be dampened by $\tau(t)$, a dampening function such as $1/(1+t/10)$. The move can be perturbed by a random vector, where D is the longest dimension of the bounding box of the irregular area and $\delta(t)$ is the annealing cooling schedule function given by equation 2, in which $\alpha$ is the annealing parameter that can be tuned for the specific application, and where $w_i$ is a random vector whose x and y components are drawn from the interval [−1.0, 1.0].

$$\delta(t)=\exp(-\alpha t) \quad \text{equation (2)}$$

The proper selection of E can be important for the algorithm. If E is chosen too small, part of the irregular area might remain uncovered. In contrast, a large E does not have a lasting negative effect, but might delay convergence until the move is sufficiently dampened. Different values of E for other germs and for boundaries of the irregular area can improve performance. The vector $v_i$ indicates the desired position for a germ at the next iteration. If this vector is very long, the system might get into an undesirable state. Thus, in practice it can be better to set a maximum move distance and to potentially move the same germ several times in a row.

For each i, $v_i$ can be repeatedly constructed as necessary until it satisfies the criteria that the new center $(c_i+v_i)$ is in the interior of the irregular shape. A stopping condition limits the number of times $v_i$ is computed (e.g. i=100); if none of the $v_i$ is satisfactory, the germ is not moved.

Stopping Condition Criteria

The criteria or stopping condition that ends this repeated process can be when the maximum length attainable by the $v_i$ is sufficiently small (e.g. less than a pixel), or after the maximum number of stages (e.g. t=100).

Scale Germs and Images

Once the positions of the germs have been determined, the scale factor for the images can be computed by taking the largest scale factor without the germs intersecting themselves or the irregular shaped boundary. Better collages can result if a small amount of intersection is allowed (e.g. 20%).

Fill in Empty Spaces with Supports Using Voronoi Algorithm

Figure 1:
FIG. 1 shows a stained glass collage created from the images in FIG. 2.

The empty spaces consist of the pixels in the irregular area outside of the germs. The Voronoi algorithm assigns to a pixel the value from its nearest germ's support. If the pixel is in the irregular area but outside the germ supports, it is assigned the background color. The resulting collage will consist of non-rectangular images. The boundaries between images will look similar to FIG. 1.

Variation: Multiple Iterations

Depending on the application domain and the irregularity of the areas, the algorithm can be run several times, and then the best result can be chosen. The best result may be characterized by the smallest total empty area after the scaling and/or after the scaling and filling operations.

Variation: Maintaining Proximity

For video keyframes, images can be ordered by time and it can be desirable to maintain proximity of adjacent keyframes. This can also be the case for photos when several shots are taken in sequence of some incident that happened at an event.

To reduce the chance that germs would drift too far, an iteration can first be performed using the annealing algorithm on the initial random locations $\{r_i\}$, with the distance function defined by the point distance between each pair of locations. This will move the initial locations to more stable places. Then germ centroids can be assigned to $\{r_i\}$ and the algorithm can proceed as before, but limiting the movement of germs at each step.

Variation: Radial Timeline Layout for Disks

Figure 6:
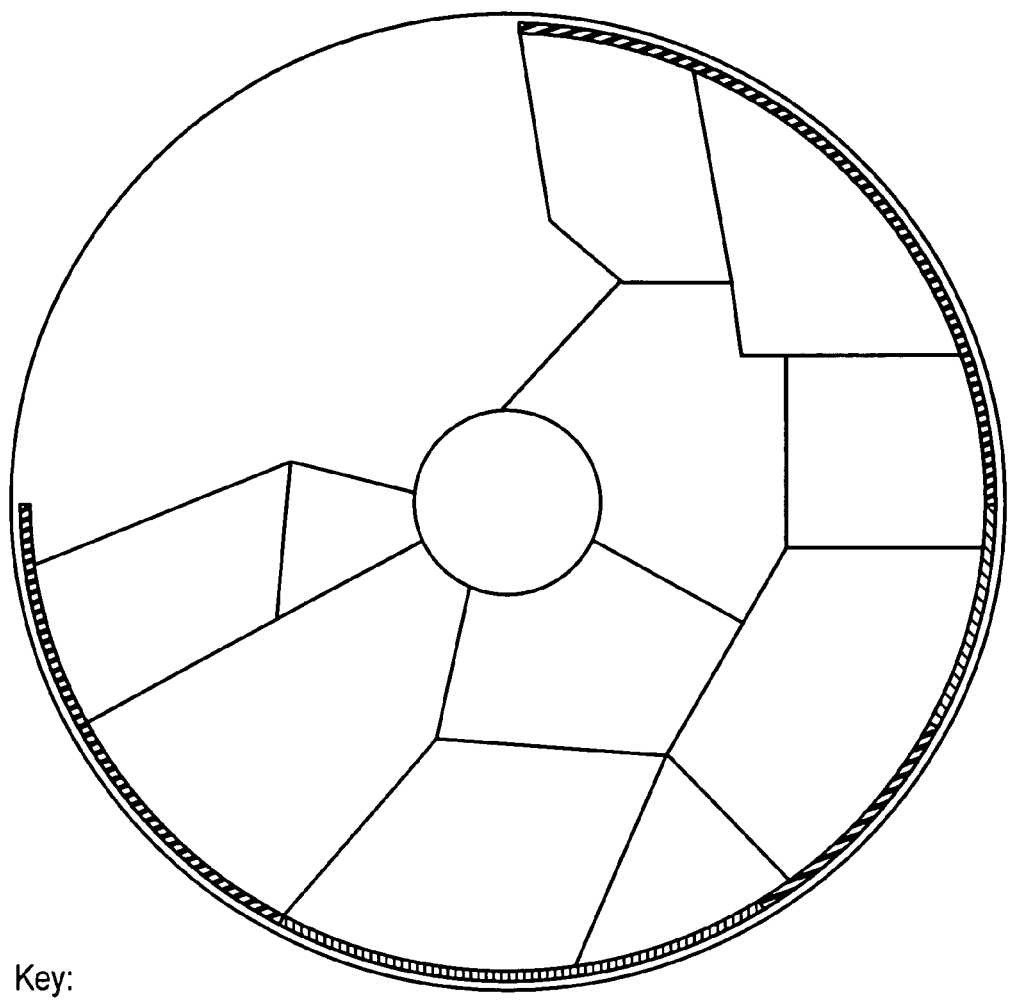
FIG. 6 shows variation with timeline.

A radial layout can be produced that reflects the time position of a keyframe in a video. A timeline ring can be placed around the rim of the disk. See FIG. 6. In an embodiment of the present invention, the ring can be placed along an outer ring or an inner ring. In an alternative embodiment of the present invention, the timeline ring can spiral around the disk.

Initially, the random locations are computed and stabilized by performing the annealing algorithm on the random locations as above. Each random location can be calculated in polar coordinates, where the location can be associated with a time based on its angular coordinate. Starting with the first keyframe and progressing in temporal order, each keyframe germ centroid can be assigned to the random location nearest to the keyframe's time.

Variation: User Specified Parameters

To make the STAINEDGLASS more customizable, the user interface may provide a widget for the user to enter the parameters. For example, the user can specify the scales of the images for selected photos. The user can also affect how much proximity can be maintained by specifying the amount of initial energy that determines the length of the random vectors used in the annealing process. For advanced users, it can be desirable to expose all the parameters in the user interface to give the user more control.

STAINEDGLASS differs from SURETHING CD/DVD LABELER DELUXE. In SURETHING, the rectangular grid is cropped when a donut shaped disk label is printed. Aesthetically, this can be less pleasing as a collage. Also, SURETHING is liable to cut out important parts of images. STAINEDGLASS is also significantly different from Photomontage where the seams between images are minimized, whereas with STAINEDGLASS the seams are highly visible to frame and delineate the individual images that make up the collage. XEROX's (Veneble) program differs from this invention in a number of respects including that it lays out whole images (not germs), all the objects are rectangles, and overlaps are not allowed. 'KANDINSKY' is solving a different problem than the present invention. KANDINSKY is more about template matching than laying out images in an empty target area. PICASA has no feature for making collages on irregular shapes (e.g., disk labels).

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

Various embodiments of the invention may be implemented using a processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of component circuits, as will be readily apparent to those skilled in the art.

Various embodiments include a computer program product which can be a storage medium (media) having instructions and/or information stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage devices, ROMs, RAMs, EPROMs, EEPROMs, DRAMs, PRAMS, VRAMs, flash memory devices, magnetic or optical cards, nano-systems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions and/or information, which can be used by one or more processors to perform any of the features, presented herein. In various embodiments, the transmission may include a plurality of separate transmissions.

Stored on one or more computer readable media, the present disclosure includes software for controlling the hardware of the processor(s), and for enabling the computer(s) and/or processor(s) to interact with a human user or other device utilizing the results of the present invention. Such software may include, but is not limited to, device drivers, interface drivers, operating systems, execution environments/containers, user interfaces and applications.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers, interface drivers and remote software to do the function. The invocations or calls can include invocations or calls in distributed and client/server systems.

What is claimed is:

1. A method of creating a collage from a plurality of N images on a target area comprising:

(a) determining a germ for each of the plurality of images, wherein the germ comprises a region of interest for a corresponding one of the images;
   (b) assigning initial positions in the target area for the plurality of germs;
   (c) calculating a respective translation vector for a respective germ of the plurality of germs, wherein the respective translation vector for the respective germ has a length determined at least in part by positions of the respective germ and a nearest germ;
   (d) moving the respective germ of the plurality of germs according to the respective translation vector; and
   (e) repeating steps (c) and (d) until a stopping condition is met.

2. The method of claim 1, wherein the images are selected from a set of photos.

3. The method of claim 1, wherein the images are selected from a set of video keyframes.

4. The method of claim 1, wherein the target area is an irregular shape.

5. The method of claim 1, wherein the target area is circular.

6. The method of claim 5, wherein assigning the initial positions for the plurality of germs includes assigning the initial positions for the plurality of germs in a radial layout in accordance with a time line of a respective image corresponding to the respective germ.

7. The method of claim 5, wherein the target area has a hole in the middle.

8. The method of claim 7, further comprising printing the plurality of images as a disk label.

9. The method of claim 7, further comprising placing a central germ in the hole.

10. The method of claim 1, wherein (b) assigning the initial positions includes assigning the initial positions of the germs randomly, the method further comprising:

(f) selecting a random N+1 point to represent the position of one of the plurality of germs; and
    (g) repeating step (f) until an initial criteria is met.

11. The method of claim 10, wherein the initial criteria in step (g) is met after a set number of selections.

12. The method of claim 10, wherein the initial criteria in step (g) is met when a point representing a centroid of a germ is greater in distance than E/2 to any other points representing centroids of the plurality of germs, where E is an expected distance between points in the target area.

13. The method of claim 1, wherein the initial position of the germs in step (b) is assigned based on respective sizes of the germs, wherein a largest germ is assigned to a position farthest from positions of any other germs and the next largest germ to a position next farthest from any other germs.

14. The method of claim 1, wherein the initial position of the germs in step (b) is assigned based on a sequence associated with the images.

15. The method of claim 1, further comprising, prior to step (c), scaling the germs uniformly.

16. The method of claim 1, wherein the respective germ of the plurality of germs to be moved can be randomly selected.

17. The method of claim 1, wherein (d) moving the respective germ of the plurality of germs includes selecting the respective germ of the plurality of germs based on a respective distance each germ needs to be moved, wherein a germ with a greatest distance to be moved is selected first.

18. The method of claim 1, where in step (c) the translation vector is calculated in accordance with an annealing algorithm.

19. The method of claim 1, wherein the respective translation vector includes one or both of a dampening factor and a perturbation factor.

20. The method of claim 1, further comprising:
selecting a support for each of the plurality of images, wherein the support is a remainder of a corresponding image other than the germ; and assigning pixels to empty space based on the support for each of the plurality of images.

21. The method of claim 20, wherein the plurality of germs are scaled prior to filling the empty space.

22. The method of claim 20, wherein the empty space is defined by a Voronoi algorithm.

23. A system of creating a collage from a plurality of N images on a target area, comprising one or more processors and a non-transitory storage medium storing instructions for:
   (a) determining a germ for each of the plurality of images, wherein the germ comprises a region of interest for a corresponding image;
   (b) assigning initial positions in the target area for the plurality of germs;
   (c) calculating a respective translation vector for a respective germ of the plurality of germs, wherein the respective translation vector for the respective germ has a length determined at least in part by positions of the respective germ and a nearest germ;
   (d) moving the respective germ of the plurality of germs according to the respective translation vector; and
   (e) repeating steps (c) and (d) until a stopping condition is met.

24. The system of claim 23, wherein (a) determining the germ for each of the plurality of images includes determining a support for each of the plurality of images; and
   the storage medium further stores instructions for:
      scaling the plurality of germs; and
      assigning pixels to empty space based on the plurality of supports.

25. The method of claim 1, wherein the respective translation vector for the respective germ has a direction determined at least in part by positions of a centroid of the respective germ and a boundary of the nearest germ.

26. The method of claim 1, wherein the respective translation vector for the respective germ has a direction determined at least in part by positions of a centroid of the respective germ and a boundary of the target area.

27. The method of claim 1, wherein the stopping condition is met after a set number of repeats.

28. A method of creating a collage from a plurality of N images on a target area comprising:
   (a) determining a germ for each of the plurality of images, wherein the germ comprises a region of interest for a corresponding one of the images;
   (b) assigning initial positions in the target area for the plurality of germs;
   (c) calculating a respective translation vector for a respective germ of the plurality of germs, wherein the respective translation vector for the respective germ has a direction determined at least in part by a position of a preassigned point of the respective germ and a position of a boundary of the nearest germ or a boundary of the target area;
   (d) moving the respective germ of the plurality of germs according to the respective translation vector; and
   (e) repeating steps (c) and (d) until a stopping condition is met.

29. A system of creating a collage from a plurality of N images on a target area, comprising one or more processors and a non-transitory storage medium storing instructions for:
   (a) determining a germ for each of the plurality of images, wherein the germ comprises a region of interest for a corresponding one of the images;
   (b) assigning initial positions in the target area for the plurality of germs;
   (c) calculating a respective translation vector for a respective germ of the plurality of germs, wherein the respective translation vector for the respective germ has a direction determined at least in part by a position of a preassigned point of the respective germ and a position of a boundary of the nearest germ or a boundary of the target area;
   (d) moving the respective germ of the plurality of germs according to the respective translation vector; and
   (e) repeating steps (c) and (d) until a stopping condition is met.

30. The method of claim 28, wherein the preassigned point of the respective germ is a centroid of the respective germ.

31. The method of claim 28, wherein the respective translation vector includes one or both of a dampening factor and a perturbation factor.

32. The system of claim 29, wherein the preassigned point of the respective germ is a centroid of the respective germ.

33. The system of claim 29, wherein the respective translation vector includes one or both of a dampening factor and a perturbation factor.

* * * * *